June 8, 1948.  C. T. O'HARROW  2,442,903
VEHICLE RUNNING GEAR
Filed Jan. 13, 1945  2 Sheets-Sheet 1
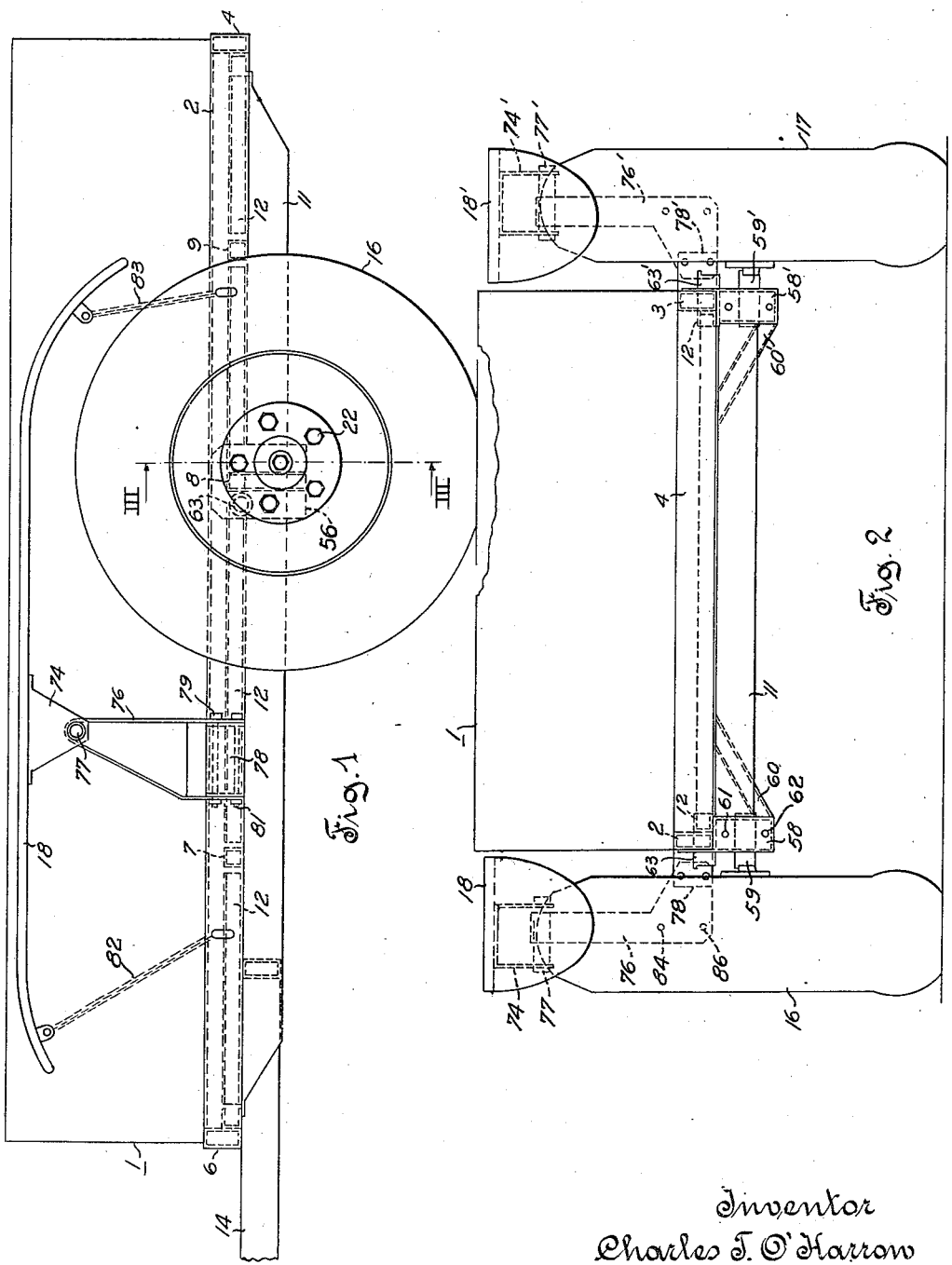
Inventor
Charles T. O'Harrow
by W. Gerold
Attorney

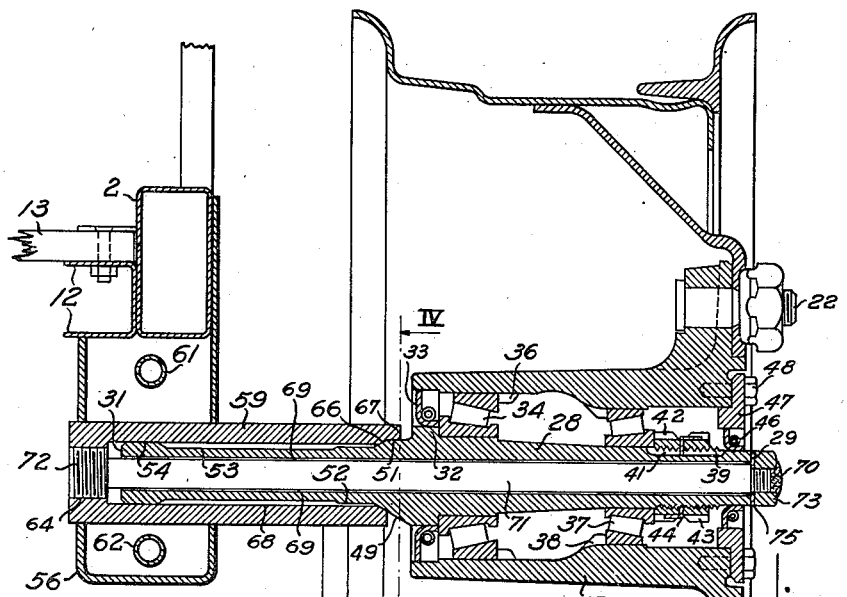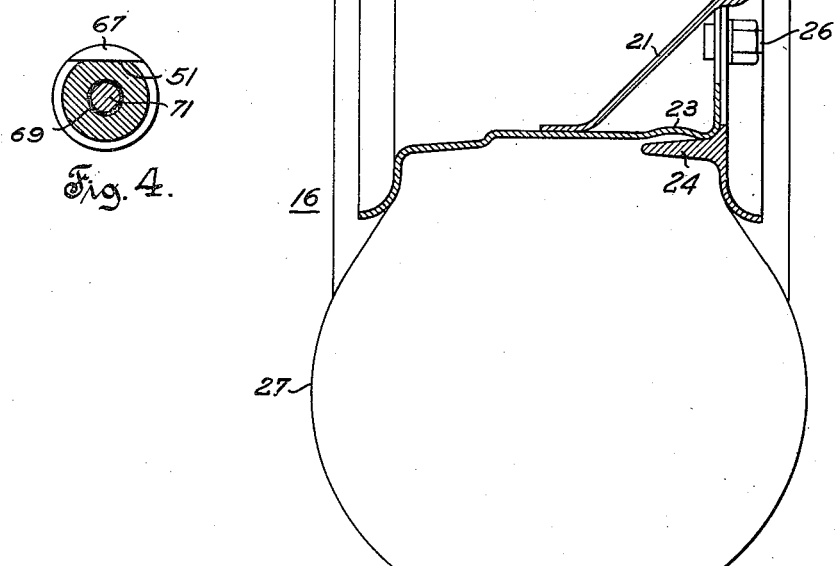

Patented June 8, 1948

2,442,903

UNITED STATES PATENT OFFICE 2,442,903

VEHICLE RUNNING GEAR

Charles T. O'Harrow, Wauwatosa, Wis., assignor to Allis-Chalmers Manufacturing Company, Milwaukee, Wis., a corporation of Delaware Application January 13, 1945, Serial No. 572,629

12 Claims. (Cl. 301—132)

The invention relates to vehicles, and more particularly to running gear for land vehicles and the mounting of the running gear on the vehicle body.

It is an object of the invention to provide a vehicle in which a running gear assembly and a complementary support therefor on the vehicle body are connected with each other through an improved form of separable connecting device which greatly facilitates and expedites the work of installing the running gear assembly on the vehicle body and removing it therefrom.

Another object of the invention is to provide a separable connecting device of the mentioned character which is so constructed that the running gear assembly and its complementary support may be freely moved into and out of cooperative engagement with each other in order to connect the running gear assembly in supported relation with the vehicle body and to remove it therefrom, and which device will also be readily operable, while the running gear assembly and the complementary support are connected in supported relation with each other, to lock the running gear assembly in operative position on and to release it for removal from the vehicle body.

A further object of the invention is to provide a separable connecting device of the mentioned character including a locking element which will be operable in one direction to secure the running gear assembly in operative position on the vehicle body, and in another direction to release the running gear assembly for removal from the vehicle body and to initiate or assist such removal.

A more specific object of the invention is to provide an improved detachable running gear assembly comprising a wheel and a supporting axle therefor, and to provide a locking device for said assembly which will be readily accessible for manipulation from the axially outer side of the wheel, so that it will be unnecessary for a man to reach around the wheel or to crawl under the vehicle body when the running gear assembly is to be installed on or removed from the vehicle body.

A still further object of the invention is to provide an improved detachable running gear mounting which is simple in construction, efficient and reliable in operation, and which may be manufactured at relatively low costs.

The foregoing and other objects and advantages of the invention will become more fully apparent from the following description of a preferred embodiment of the inventions shown in the accompanying drawings. Referring to the drawings, in which like reference characters designate the same or similar parts in the various views:

Fig. 1 is a side view of a trailer for use in connection with an automotive vehicle (not shown), a wheeled running gear assembly at the near side of the trailer being shown in operative position, and a ski unit for use in lieu of the wheeled running gear assembly being shown in inoperative position;

Fig. 2 is a rear view of the trailer shown in Fig. 1;

Fig. 3 is an enlarged section on line III—III of Fig. 1;

Fig. 4 is a section on line IV—IV of Fig. 3.

The trailer shown in the drawings has a box-type body structure generally indicated by the reference character 1, the bottom part of the body structure being formed by a rigid rectangular frame work of suitable construction. As shown in Figs. 1 and 2 the frame work comprises parallel tubular side sills 2 and 3 of rectangular cross-section, and parallel transverse connecting members extending at right angles to the side sills between the front and rear ends thereof, the rearward transverse connecting member being indicated at 4 in Figs. 1 and 2, and the forward transverse connecting member being indicated at 6 in Fig. 1. Intermediate transverse connecting members 7, 8 and 9 indicated in Fig. 1 extend between the side sills parallel to the forward and rearward connecting members 4 and 6, and all of the connecting members are tubular and have a rectangular cross-section, the height of the end members 4 and 6 being the same as that of the side sills 2 and 3, and the height of the intermediate members 7, 8 and 9 being about half of the height of the side sills. As shown in Figs. 1 and 2 the side sills and connecting members are secured together, as by welding, to extend in a common horizontal plane, and a drop pan 11 is secured to the underside of the frame to provide a closure therefor. Channels 12 are secured to inner sides of the side sills for mounting floor boards 13 thereon, as best shown in Fig. 5. A draft tongue 14 is suitably mounted on the frame at the forward end thereof for hitching the trailer to a draft vehicle, not shown.

The body structure 1 of the trailer, as shown in Figs. 1 and 2, is supported on a pair of ground engaging wheels 16 and 17 which are mounted at opposite sides, respectively, of the vehicle body, and which may readily be installed on and removed from the vehicle body, as will be described in fuller detail hereinbelow. Fig. 1 also shows a ski 18 mounted in an inoperative or transport position at the left side of the vehicle body, and a companion ski 18' is similarly mounted at the right side of the vehicle body, as indicated in Fig. 2. If it is desired to run the trailer on the skis, the wheels 16 and 17 may be removed from their operative positions in which they are shown in Fig. 2 and be remounted on the vehicle body in elevated inoperative positions, and the skis may be mounted in operative positions, as will be explained more fully hereinbelow.

The wheel 16 is part of a running gear assembly at the left side of the trailer and the wheel 17 is part of a corresponding running gear assembly at the right side of the trailer. Referring to Fig. 3, the wheel 16 comprises a flanged hub 19, a dished disk body 21 which is secured to the flange of the hub 19 by a circumferential series of bolts and nuts 22 and carries a fixed rim section 23, a detachable rim section 24 which is secured to an inwardly projecting flange of the fixed rim section 23 by a circumferential series of bolts and nuts 26, and a pneumatic tire 27 mounted between the rim sections 23 and 24. The wheel 16 is rotatably mounted on a stub axle 28 which has a hollow spindle portion within the hub 19 and a hollow shank portion in axial alinement with the hollow spindle portion and projecting from the hub at the axially inner side of the wheel 16.

The opposite end faces of the stub axle are indicated at 29 and 31, and the stub axle has a portion 32 of largest diameter approximately at the middle between said end faces. The portion 32 is of relatively short axial length and has a smoooth cylindrical outer surface for cooperation with an oil seal 33. Next to the portion 32, and at the right thereof in Fig. 3, the stub axle is turned down to provide a cylindrical seat and a radial abutment for the inner race of a roller bearing 34 the outer race of which is fitted into the hub 19 and bears axially against an internal shoulder 36 of the hub. Another roller bearing 37 is operatively interposed between the stub axle 28 and the hub 19 at a suitable axial distance from the roller bearing 34 and comprises an outer race which bears axially against an internal shoulder 38 of the hub and an inner race which is fitted upon a turned down cylindrical portion of the stub axle 28 for adjustment axially thereof. Next to the inner race of the roller bearing 37 and at the right thereof in Fig. 3 an external screw thread 39 is cut into the stub axle 28 and also a keyway 41. Screwed upon the thread 39 is a nut 42 which provides an axial abutment for the inner race of the roller bearing 37 and which is adjusted to such a position that the roller bearings 34 and 37 will properly function to support the wheel 16 on the stub axle 28 for free rotation thereon without appreciable axial play. The nut 42 is locked in adjusted position by means of a second nut 43 and a lockwasher 44 which has a circumferential series of external prongs bent alternately over the flats of the nuts 42 and 43, and a radial inwardly projecting tongue within the keyway 41 for positively securing the lockwasher and nuts against rotation on the stub axle. Next to the screw thread 39 and at the right side thereof in Fig. 3 the stub axle has a short cylindrical outer surface for cooperation with an oil seal 46. The oil seal 46 is mounted in a cover 47 which is secured to the end of the hub 19 at the axially outer side of the wheel by a circumferential series of cap screws 48.

Next to the central portion 32 of the stub axle 28 and at the left side thereof in Fig. 3, the stub axle is turned down to provide a tapered shoulder 49, and a flat 51 is milled into the tapered shoulder 49 at the upper side of the stub axle as shown more clearly in Fig. 4. The smaller end of the tapered shoulder 49 merges with a cylindrical portion 52 of the stub axle, and next to the portion 52 the stub axle has a relatively long circumferentially recessed portion 53. A cylindrical end portion 54 of the stub axle extends between the recessed portion 53 and the end face 31 and has a smooth outer surface of slightly larger diameter than the cylindrical portion 52.

A complementary support for the running gear assembly comprising the wheel 16 and stub axle 28 is mounted on the body structure of the trailer, as shown in Figs. 1, 2 and 3. The complementary support comprises a U-shaped plate member 56, a vertical transverse rear plate 58 (Fig. 2) and a similar vertical transverse front plate connected with the plate member 56, as by welding, to form a box-type bracket, and a socket tube 59 which is mounted in and extends laterally from the bracket. As shown in Fig. 3, the U-shaped plate member 56 is supported on the side sill 2 of the trailer frame in a depending position, one of the legs of the bracket overlapping the side sill at its outer side and being suitably secured thereto, as by welding. The other leg of the U-plate 56 extends upwardly under the trailer frame and is connected at its upper end, as by welding, to the lower flange of the adjacent channel 12. As shown in Fig. 2, the box bracket comprising the plates 56 and 58 is braced by a diagonal strut 60 which is secured at its lower end to a lower portion of the U-plate 56 and at its upper end to the transverse connecting member 8 of the trailer frame. The legs of the U-plate 56 have alined holes accommodating the socket tube 59 and the latter is secured in axially fixed position on the U-plate, preferably by welding around the holes. Longitudinal reinforcing tubes 61 and 62 extend in the space between the legs of the U-plate 56 above and below the socket tube 59, and are secured, as by welding, in holes of the front and rear plate 58 of the bracket.

As shown in Figs. 1 and 2, another transverse socket tube 63 is mounted on the box-type bracket in a higher position than the socket tube 59, the socket tube 63 being an exact duplicate of the socket tube 59 and serving to support the stub axle 28 when the ski unit is in operative position, as will be explained more fully hereinbelow.

Referring again to Fig. 3, a screw tapped hole 64 of appreciable axial length is formed at the inner end of the socket tube 59, and a tapered seat 66 is formed at the outer end of the tube. Next to the wide end of the tapered seat 66 the socket tube 59 has a projection 67 which as shown in Fig. 4 is of segmental shape and which may be formed conveniently by feeding a milling cutter radially into the outer end of the tube so that it will advance along the chord of the segmental projection while cutting off a suitable portion of the tube. The portion of the socket tube 59 which extends from the small end of the tapered seat 66 towards the tapped hole 64 is bored out to provide a relatively long cylindrical surface 68, the diameter of the bore being such that the cylindrical end portion 54 of the stub axle 28 will have a telescopic fit within the socket tube 59. The taper of the seat 66 on the socket tube 59 is the same as the taper of the shoulder 49 on the stub axle 28, and in the assembled position of the parts as shown in Fig. 3 the flat 51 on the tapered shoulder 49 cooperates with the chord of the segmental projection 67 on the socket tube 59 to prevent the stub axle from rotating within the socket tube 59.

As mentioned hereinbefore, the spindle portion of the stub axle 28 which extends into the wheel hub 19 and the shank portion of the stub axle which extends into the socket tube 59 are hollow, and these hollow axle and spindle portions are so arranged as to provide an axial passage within the stub axle 28. In other words, the stub axle 28 has an axial passage 69 which extends therethrough from the end face 29 to the end face 31, and which as shown in Fig. 4 has a circular cross-section. A long bolt passing through the axial passage 69 comprises a solid shank portion 71 of circular cross-section, a radially enlarged threaded end portion 72 screwed into the tapped hole 64 of the socket tube 59, and a hexagonal head 73 at the axially outer end of the stub axle 28. The threaded end portion 72 of the bolt and the shank portion 71 are formed in one piece, and the hexagonal head 73 consists of a nut which is screwed upon a threaded end portion of the shank 71 and is permanently secured thereto by a plug weld 70. The part of the shank 71 which extends between the radially enlarged end portion 72 and the head 73 is of slightly smaller diameter than the axial passage 69 of the stub axle 28, and a lockwasher 75 is interposed between the end face 29 of the stub axle and the head 73.

The foregoing explanations with reference to Fig. 3 apply to the wheeled running gear assembly at the near side of the trailer shown in Fig. 1. The wheel 17 at the other side of the trailer forms part of a running gear assembly which is an exact duplicate of the running gear assembly comprising the wheel 16 and stub axle 28, and what has been said hereinbefore regarding the construction and mounting of the wheel 16 similarly applies to the construction and mounting of the wheel 17. Like the left running gear assembly comprising the wheel 16, the right running gear assembly comprising the wheel 17 has a complementary support on the body structure of the trailer, and the complementary support for the right running gear assembly is an exact duplicate of the complementary support for the left running gear assembly. It is mounted, as indicated in Fig. 2, on the side sill 3 of the trailer frame and has a socket tube 59' which corresponds to and is axially alined with the socket tube 59, so that the wheels 16 and 17 will be rotatable on a common axis when the right and left wheeled running gear assemblies are mounted in operative position on the body structure of the trailer. The parts 58', 60' and 63' at the right side of Fig. 2 are duplicates of the corresponding parts 58, 60 and 63 at the left side of Fig. 2.

In order to remove the wheeled running gear assembly comprising the wheel 16 and the stub axle 28 from its operative position in which it is shown in Figs. 1, 2 and 3, the trailer is first jacked up to relieve the wheel 16 of the load of the vehicle body. A wrench is then applied to the hexagonal head 73 of the bolt or connecting element 71, 72, 73, and since the head 73 is plug welded to the shank, as stated, turning of the head 73 by means of the wrench will cause the threaded head 72 to turn within the tapped hole 64 of the socket tube 59. Rotation of the bolt 71, 72, 73 in anticlockwise direction as viewed from the axially outer side of the wheel, will cause axial outward movement of the bolt due to cooperation of the threaded head 72 with the thread of the tapped hole 64, and as a result, the stub axle 28 will first be relieved of the axial inward pressure by the head 73 to which it is normally subjected in order to hold the tapered shoulder 49 on the stub axle firmly in engagement with the tapered seat 66 of the socket tube 59. Due to the wedging effect between the shoulder 49 and seat 66, or other causes, the stub axle 28 may not become freely movable for axial displacement within the socket tube 59 after the first few turns of the bolt 71, 72, 73 in anticlockwise direction, and in that case the stub axle 28 will remain in the axial position relative to the socket tube 59, in which it is shown in Fig. 3, while the bolt moves axially within the internal passage 69 of the stub axle during the first few turns of the bolt in anticlockwise direction. It will be noted, however, that the threaded head 72 forms an axial abutment on the shank 71 of the bolt, and that the threaded head 72 has a sufficient axial length, so that the head 72 may engage the end face 31 of the stub axle 28 upon continued rotation of the bolt in anticlockwise direction. As shown in Fig. 3, the axial spacing between the end face 31 of the stub axle and the end of the tapped hole 64 next to the end face 31 is considerably shorter than the axial length of the threaded head 72. Accordingly, when the stub axle 28 is wedged or stuck within the socket tube 59 in the position in which it is shown in Fig. 3, rotation of the bolt 71, 72, 73 in anticlockwise direction will first bring the head 72 into axial engagement with the end face 31 of the stub axle, and by continued anticlockwise rotation of the bolt a powerful axial thrust may be exerted upon the stub axle 28 for positively moving it some distance axially within the socket tube 59 before the threaded head 72 becomes disengaged from the tapped hole 64. Such initial positive axial movement of the stub axle will ordinarily loosen it sufficiently within the socket tube 59, so that when the threaded head 72 becomes disengaged from the hole 64, the shank portion of the stub axle may be removed telescopically from the socket tube 59 by axial outward withdrawal of the entire running gear assembly comprising the wheel 16 and the stub axle 28. During such withdrawal, the bolt 71, 72, 73 will remain loosely connected with the stub axle, its axial separation therefrom being prevented by the heads 72 and 73.

In order to install the wheeled running gear assembly comprising the wheel 16 and the stub axle 28 in its operative position on the trailer frame, the wheel and axle are manipulated as an assembled unit, to insert the cylindrical end portion 54 of the stub axle 28 into the axially outer end of the socket tube 59. The threaded head 72 of the bolt 71, 72, 73 enters the socket tube together with the end portion 54 of the stub axle, and the shank portion of the stub axle is then pushed into the socket tube by proper manipulation of the running gear assembly, until the threaded head 72 of the bolt abuts the threaded hole 64 of the socket tube. The cylindrical end portion 54 and the cylindrical portion 52 of the stub axle now cooperate with the bore 68 of the socket tube to provisionally support the wheeled running gear assembly on the trailer frame. The tapered shoulder 49 of the stub axle and the tapered seat 66 of the socket tube 59 are axially separated from each other in this provisionally supported position of the running gear assembly on the trailer frame, and before the shank portion of the stub axle is inserted into the socket tube the stub axle is turned to the proper position so that the flat 51 on the shoulder 49 will face upwardly. Next, in order to bring the tapered shoulder 49 upon the seat 66 of the socket tube 59, a wrench is applied to the hexagonal head 73 of the bolt 71, 72, 73, and by turning the bolt clockwise and simultaneously pushing it towards the vehicle body the threaded head 72 may be started in the tapped hole 64. By continued clockwise rotation of the bolt the stub axle will then be forced inwardly until the tapered shoulder 49 becomes firmly seated on the tapered seat 66 of the socket tube 59. As a result, the stub axle 28 will then be securely retained in the socket tube 63, and the wheel 16 will be supported on the trailer in operative position, as indicated in Figs. 1, 2 and 3.

A second socket tube 63 is mounted, as mentioned hereinbefore, on the box-type bracket 56, 57, 58 and at a higher level than the socket tube 59, the tube 63 being an exact duplicate of the socket tube 59. Accordingly, when it is desired to mount the running gear assembly 16, 28 in an inoperative position on the trailer in order to prepare the trailer for running on the skis, the stub axle 28 may be mounted on the socket tube 63 and fixed in position thereon in the same manner as has been explained hereinbefore in connection with the socket tube 59.

The ski unit at the left side of the trailer, as shown in Figs. 1 and 2, comprises a wooden ski 18, a ski bracket 74 rigidly secured to the ski, and a ski support 76 which is pivotally connected at 77 with the ski bracket 74, and which is detachably connected to a bracket 78 on the trailer frame by means of bolts 79 and 81, the support 76 being forked to straddle the bracket 78. A pair of chains 82 and 83 are suitably arranged between forward and rearward portions, respectively, of the ski 18 and the trailer frame for retaining the ski in horizontal position on the pivot 77. In its inoperative position as shown in Fig. 1, the ski 18 serves as a fender for the wheel 16.

In order to mount the ski unit at the left side of the trailer in its operative position after the wheel 16 and associated parts have been removed from the socket tube 59, the ski unit is first detached from the trailer by withdrawing the bolts 79 and 81 and disconnecting the chains 82 and 83 from the trailer frame. The detached unit is then turned around and placed into position for attachment to the bracket 56, with the running surface of the ski 18 facing downwardly and the free end of the bracket 76 straddling the bracket 56. The bolts 79, 81 are then inserted through holes 84, 86 (Fig. 2) in the ski support 76 and through the reinforcing tubes 61, 62, and upon tightening of the nuts on the bolts 78, 81 the ski support will be securely fixed in operative position on the trailer frame. The chains 82 and 83 may be suitably arranged between the inverted ski 18 and the trailer frame, preferably with some slack, to limit rocking movement of the ski 18 about the pivot 77.

Another ski unit at the right side of the trailer, as shown in Fig. 2, comprises a ski 18', a ski bracket 74', a ski support 76', and a pivot 77', which parts are duplicates of the corresponding parts at the left side of the trailer. The ski unit at the right side of the trailer is arranged for mounting on the trailer frame in the same manner as the ski unit at the left side of the trailer, and the foregoing explanations with reference to the ski unit at the left side of the trailer similarly apply to the ski unit at the right side of the trailer.

The wheeled running gear assemblies at the opposite sides of the trailer are constructed and arranged so that they may be removed conveniently from the trailer frame while the ski units are supported on the trailer frame in inoperative position as shown in Fig. 1, and after the ski units have been arranged in their operative positions, the wheeled running gear assemblies may be conveniently reinstalled on the trailer by mounting them on the socket tubes 63 and 63', respectively. Similarly, when it is desired to move the ski units from their operative positions to their inoperative positions (Fig. 1), the wheeled running gear assemblies may first be removed from their inoperative positions and after the ski units have been installed in their inoperative positions (Fig. 1) the wheeled running gear assemblies may be conveniently installed in their operative positions (Fig. 1).

From the foregoing explanations it will be apparent that the wheeled running gear assembly at either side of the trailer may be conveniently installed on the body structure of the trailer in either an operative or an inoperative position. Each of the socket tubes 59, 63 represents an element forming one part of a telescopic joint, and the stub axle 28 forms a complementary part of said joint, the axial passage 69 of the stub axle being in alinement with the axis of the joint. The telescopic joint serves to suitably position the wheeled running gear assembly on the body structure of the trailer, and the joint may be readily separated for the purpose of removing the running gear assembly from the body structure of the trailer. While the running gear assembly is supported on the body structure of the trailer, the bolt 71, 72, 73 may be turned in one direction to secure the running gear assembly in axially fixed position on the body structure, and the bolt may be turned in the opposite direction to release the running gear assembly for removal from the body structure. Rotation of the bolt in the opposite direction, moreover, will be effective, as explained hereinbefore, to move the threaded head 72 of the bolt into axial engagement with the end face 31 of the stub axle 28, and removal of the running gear assembly may therefore be initiated or assisted by rotation of the bolt in said opposite direction. In order to lock and unlock the running gear assembly only one connecting element, namely the bolt 71, 72, 73 has to be manipulated, and the hexagonal head 73 of this bolt is readily accessible for manipulation from the axially outer side of the wheel. The work of installing the wheeled running gear assemblies on the body structure of the trailer and of removing them therefrom can therefore be performed quickly and conveniently without necessity of demounting the wheel from the stub axle or of having a man crawl under the trailer or reach around the wheel.

While in the foregoing a preferred embodiment of the invention has been disclosed with reference to the drawings, it should be understood that it is not intended to limit the invention to the specific construction herein disclosed for various modifications within the scope of the appended claims may occur to persons skilled in the art.

It is claimed and desired to secure by Letters Patent:

1. In a vehicle having an axle support comprising an element forming the outer part of a telescopic joint, the combination of an axle element forming a complementary inner part of said telescopic joint and having an axial passage therethrough, means including a connecting element extending through said passage and having a portion cooperating with said complementary joint part and another portion releasably cooperating with said outer joint part, for securing said joint parts in axially fixed position relative to each other, and means for mounting a ground engaging supporting element on said complementary joint part.

2. In a vehicle having an axle support comprising an element forming the outer part of a telescopic joint, the combination of an axially screw threaded portion at one end of said outer joint part, an axle element forming a complementary inner part of said telescopic joint and having a passage therethrough in axial alinement with said screw threaded portion, a connecting element extending through said passage and cooperatively engaging said threaded portion of said outer joint part and a portion of said complementary joint part, said connecting element being operative, upon rotation thereof in one direction, to secure said joint parts against axial separation from each other, a shoulder formed on said connecting element and abuttable against said complementary joint part and operative, upon rotation of said connecting element in the opposite direction, to axially move said complementary joint part relative to said outer joint part, and means for mounting a ground engaging supporting element on said complementary joint part.

3. A device for detachably mounting a wheel on a support, comprising, in combination, an element forming one part of telescopic joint and having a screw threaded portion in alinement with the axis of said joint, means for mounting said one part of said telescopic joint on said support, another element forming a complementary part of said telescopic joint and having an internal passage in axial alinement with said screw threaded portion, a connecting element extending through said internal passage and cooperatively engaging said threaded portion of said one joint part and a portion of said complementary joint part for releasably securing said joint parts against axial separation from each other, and means for rotatably mounting said wheel in axially fixed position on said complementary joint part.

4. A device for detachably mounting a wheel on a support, comprising, in combination, a stub axle having a hollow spindle portion and a hollow shank portion, bearing means for rotatably mounting said wheel on said spindle portion, socket means associated with said support and cooperating with said shank portion to detachably mount said stub axle on said support in load transmitting relation thereto and for axial withdrawal therefrom, a connecting element extending through said hollow spindle and shank portions and having a portion cooperating with said spindle portion and another portion releasably cooperating with said socket means for detachably securing said stub axle against said axial withdrawal from said socket means.

5. A device for detachably mounting a wheel on a support, comprising in combination, a socket element rigidly connected with said support, a stub axle having a hollow shank portion axially slidable within said socket element and a hollow spindle portion extending from said shank portion and supportingly connected with said wheel, and a bolt element extending through said shank and spindle portions of said stub axle into threaded engagement with said socket element for detachably securing said stub axle within said socket element.

6. A device for detachably mounting a wheel on a support, comprising, in combination, a socket element connected with said support and having an axially screw threaded portion at one end thereof, a stub axle having a hollow spindle portion supportingly connected with said wheel for rotation of the latter thereon and a hollow shank portion telescopically fitted into said socket element, a connecting element extending through said hollow spindle and shank portions and having radially enlarged portions axially engageable, respectively, with said spindle and shank portions upon axial displacement of said connecting element relative to said stub axle, and a screw thread formed on said connecting element cooperatively engaging said threaded portion of said socket element to provide for said axial displacement of said connecting element upon rotation thereof in opposite directions.

7. A device for detachably mounting a wheel on a support, comprising, in combination, a socket element connected with said support and having an axially screw threaded portion at one end thereof, a stub axle having a hollow spindle portion supportingly connected with said wheel for rotation of the latter thereon and a hollow shank portion telescopically fitted into said socket element, and a connecting element extending through said hollow spindle and shank portions and having a radially enlarged head portion and a radially enlarged screw threaded portion axially engageable, respectively, with said spindle and shank portions upon axial displacement of said connecting element relative to said stub axle in opposite directions, said screw threaded portion of said connecting element cooperatively engaging said threaded portion of said socket element to provide for said axial displacement of said connecting element upon rotation thereof in opposite directions.

8. A device for detachably mounting a wheel on a support, comprising, in combination, a socket element connected with said support and having an axially tapered seat at one end thereof and an axially screw thread portion at its other end, a stub axle having a hollow spindle portion supportingly connected with said wheel for rotation of the latter thereon and a hollow shank portion in axial alinement with said spindle portion, said shank portion being telescopically fitted into said socket element and having an axially tapered shoulder engageable with said seat, and a connecting element extending through said hollow spindle and shank portions and having a radially enlarged head portion and a radially enlarged screw threaded portion engageable, respectively, with said spindle and shank portions upon axial displacement of said connecting element relative to said stub axle in opposite directions, said screw threaded portion of said connecting element cooperatively engaging said threaded portion of said socket element to provide for said axial displacement of said connecting element upon rotation thereof in opposite directions.

9. A device for detachably mounting a wheel on a support, comprising, in combination, a socket element forming the outer part of a telescopic joint, an axle element forming a complementary inner part of said telescopic joint and having an axial passage therethrough, means including a connecting element extending through said passage and having a portion cooperating with said axle element and another portion releasably cooperating with said socket element for securing said socket and axle elements in axially fixed relation to each other, means for mounting one of said telescopic joint parts on said support, and means for mounting said wheel on the other of said telescopic joint parts.

10. A device for detachably mounting a wheel on a support, comprising, in combination, a socket element forming the outer part of a telescopic joint, an axle element forming a complementary inner part of said telescopic joint and abuttable axially with said socket element upon contraction of said telecsopic joint, a screw element rotatable relative to said inner and outer joint parts on an axis extending longitudinally of said telescopic joint and cooperating with said inner and outer parts of the latter to contract said telescopic joint upon rotation of said screw element in one direction, abutment means engageable by and cooperating with said screw element to expand said telescopic joint upon rotation of said screw element in the opposite direction, means for mounting one of said telescopic joint parts on said support, and means for mounting said wheel on the other of said telescopic joint parts.

11. A device for detachably mounting a wheel on a support, comprising, in combination, a socket element forming the outer part of a telescopic joint, an axle element forming a complementary inner part of said telescopic joint and abuttable axially with said socket element upon contraction of said telescopic joint, a connecting element rotatable relative to said inner joint part and having a screw threaded connection with said outer joint part on an axis extending longitudinally of said telescopic joint, abutment means associated with said connecting element and cooperable with said inner joint part to contract said telescopic joint upon rotation of said connecting element in one direction, and to expand said telescopic joint upon rotation of said connecting element in the opposite direction, means for mounting one of said telescopic joint parts on said support, and means for mounting said wheel on the other of said telescopic joint parts.

12. A device for detachably mounting a wheel on a support, comprising, in combination, a socket element forming the outer part of a telescopic joint, an axle element forming a complementary inner part of said telescopic joint and abuttable axially with said socket element upon contraction of said telescopic joint, a connecting element rotatable relative to said inner joint part and having an externally screw threaded portion for cooperation with an internally screw threaded portion of said outer joint part on an axis extending longitudinally of said telescopic joint, abutment means associated with said connecting element and cooperable with said inner joint part to contract said telescopic joint upon rotation of said connecting element in one direction and to expand said telescopic joint upon rotation of said connecting element in the opposite direction, means for mounting one of said telescopic joint parts on said support, and means for mounting said wheel on the other of said telescopic joint parts.

CHARLES T. O'HARROW.

REFERENCES CITED

The following references are of record in the file of this patent:

UNITED STATES PATENTS

| Number | Name | Date |
| --- | --- | --- |
| 883,258 | Tolle | Mar. 31, 1908 |
| 1,108,169 | Haynes | Aug. 25, 1914 |
| 1,370,611 | Shuffleton | Mar. 8, 1921 |
| 1,661,815 | Britt | Mar. 6, 1928 |
| 2,024,423 | Brunetti | Dec. 17, 1935 |
| 2,186,060 | Batey et al. | Jan. 9, 1940 |
| 2,275,302 | Magnuson | Mar. 3, 1942 |